(12) United States Patent
Lin et al.

(10) Patent No.: US 8,389,078 B2
(45) Date of Patent: Mar. 5, 2013

(54) THREE-DIMENSIONAL EFFECT PRINTING METHOD AND ELECTRONIC DEVICE TREATED USING THE METHOD

(75) Inventors: Ze-Bo Lin, Shenzhen (CN); Shou-Ji Liu, Shenzhen (CN); Xin-Zhang Liu, Shenzhen (CN); Te-Sheng Jan, Taipei Hsien (TW); Yu-Tao Chen, Taipei Hsien (TW); Chun-Che Yen, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 16 days.

(21) Appl. No.: 12/876,253

(22) Filed: Sep. 7, 2010

(65) Prior Publication Data
US 2011/0268900 A1   Nov. 3, 2011

(30) Foreign Application Priority Data

Apr. 28, 2010  (CN) .......................... 2010 1 0158788

(51) Int. Cl.
*B32B 1/00* (2006.01)
*H01R 13/46* (2006.01)
*H01L 23/06* (2006.01)
*H05K 5/00* (2006.01)
*H05K 7/00* (2006.01)

(52) U.S. Cl. ...... 428/34.1; 428/35.7; 174/520; 174/565; 361/679.01

(58) Field of Classification Search ................. 428/34.1, 428/34.4, 34.6, 34.7, 35.7, 36.4, 36.8, 36.9, 428/36.91; 312/223.1–223.6; 174/520–565, 174/53–64; 361/679.01–837
See application file for complete search history.

(56) References Cited

U.S. PATENT DOCUMENTS

| | | | |
|---|---|---|---|
| 7,101,618 B2 * | 9/2006 | Coggio et al. | 428/336 |
| 2001/0040001 A1 * | 11/2001 | Toyooka | 156/233 |
| 2008/0104880 A1 * | 5/2008 | Hegemier et al. | 43/42.32 |

FOREIGN PATENT DOCUMENTS

| TW | 544077 | 7/2003 |
|---|---|---|
| TW | 200730067 A | 8/2007 |

* cited by examiner

*Primary Examiner* — Walter B Aughenbaugh
(74) *Attorney, Agent, or Firm* — Altis Law Group, Inc.

(57) ABSTRACT

An electronic device includes a housing. The housing includes a transparent substrate, a transparent texture layer, and a colored texture layer. The transparent texture layer is printed on the inner surface of the transparent substrate and has an uneven surface. The colored texture layer is printed on the uneven surface of the transparent texture layer. A three-dimensional effect printing method is also provided.

3 Claims, 3 Drawing Sheets

THREE-DIMENSIONAL EFFECT PRINTING METHOD AND ELECTRONIC DEVICE TREATED USING THE METHOD

BACKGROUND

1. Technical Field

The present disclosure relates to printing methods and electronic devices, particularly, to a three-dimensional effect printing method and an electronic device that is treated using the method.

2. Description of Related Art

Conventional printing methods apply static colors on the shells of electronic devices. These methods can normally create one-dimensional patterns and designs only.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
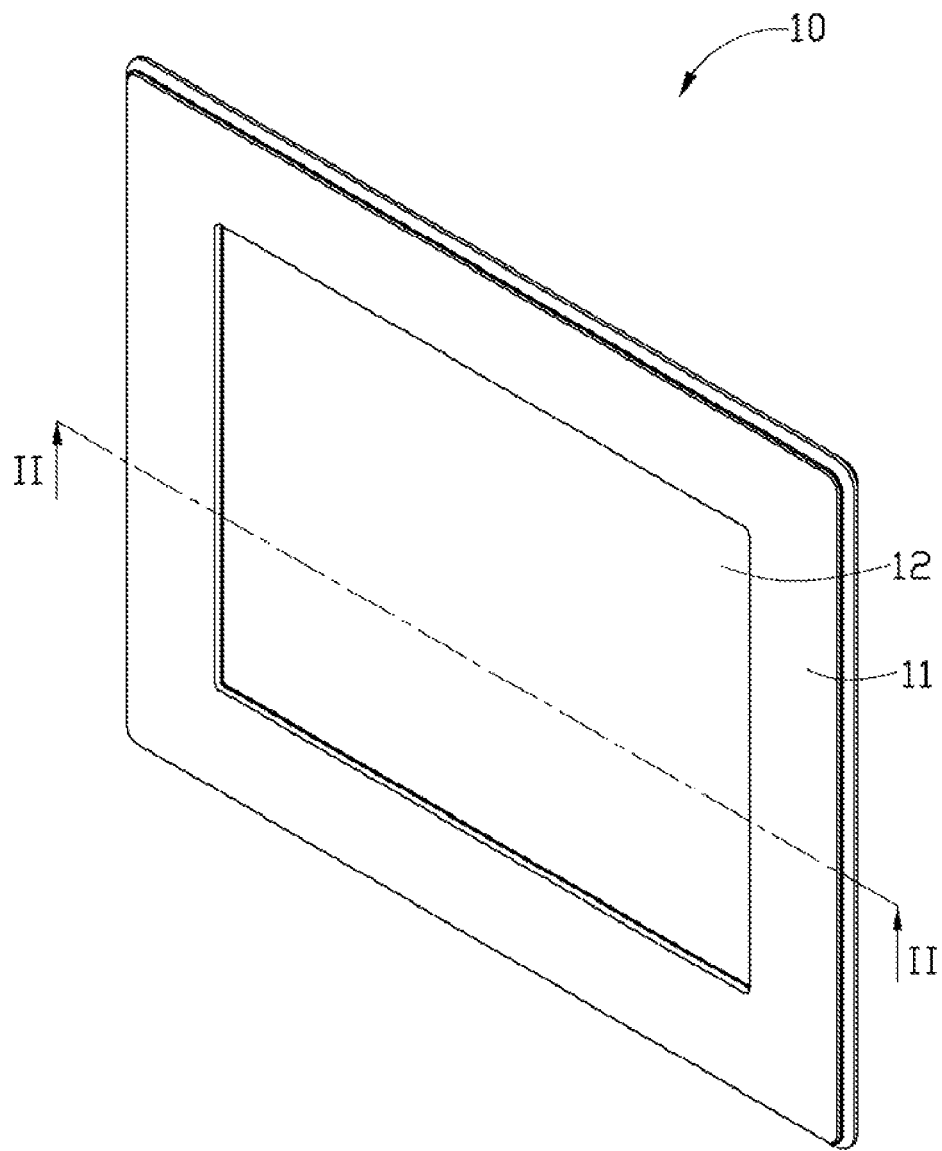
FIG. 1 is an isometric view of an electronic device according to an exemplary embodiment.

Referring to FIG. 1, an electronic device 10 according to an exemplary embodiment is disclosed. The electronic device 100 includes a housing 11 and a display 12 enclosed by the housing 11. In the embodiment, the electronic device 10 is a digital photo frame.

Figure 2:
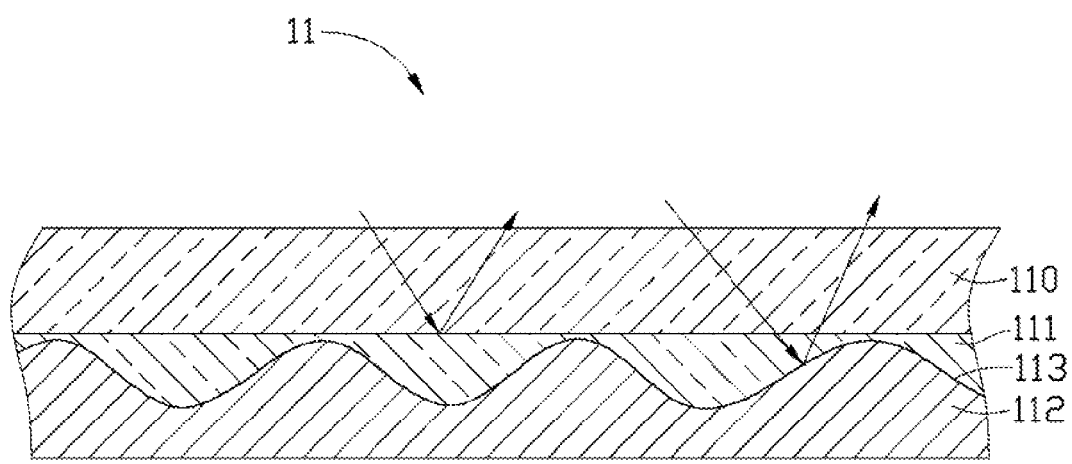
FIG. 2 is a partial cross-sectional view taken along line II-II of FIG. 1.

Referring also to FIG. 2, the housing 11 includes a transparent substrate 110. A transparent texture layer 111 is printed on an inner surface of the transparent substrate 110 and has an uneven surface 113. A colored texture layer 112 is printed on the uneven surface 113. The inner surface of the transparent substrate 110 is a surface opposite to an outer surface facing viewers.

The transparent substrate 110 can be made of transparent resin, such as PET (Polyethylene Terephthalate), PS (Polystyrene), PP (Polypropylene), PVC (polyvinyl chloride), or the like.

The transparent texture layer 111 is a layer of transparent printing ink that is printed on the transparent substrate 110 by a conventional printing process. In the embodiment, the transparent texture layer 111 can be printed to form various textured appearances as required, such as woven, marbled, and grainy.

The colored texture layer 112 is a layer of colored printing ink that is printed on the uneven surface of the transparent texture layer 111 by a conventional printing process. In the embodiment, the color of the printing ink can be varied as required.

In the embodiment, light beams penetrate through the transparent substrate 110 and can be reflected by the uneven surface 113 of the transparent texture layer 111, causing the reflected light beams from the two texture layers to overlap to creating a three dimensional appearance. The colored printing ink cooperating with the textures of the texture layer 111 can cause a surface treated this way to appear as, for instance, a red woven material, a marble-like material, and a gray grainy material.

Figure 3:
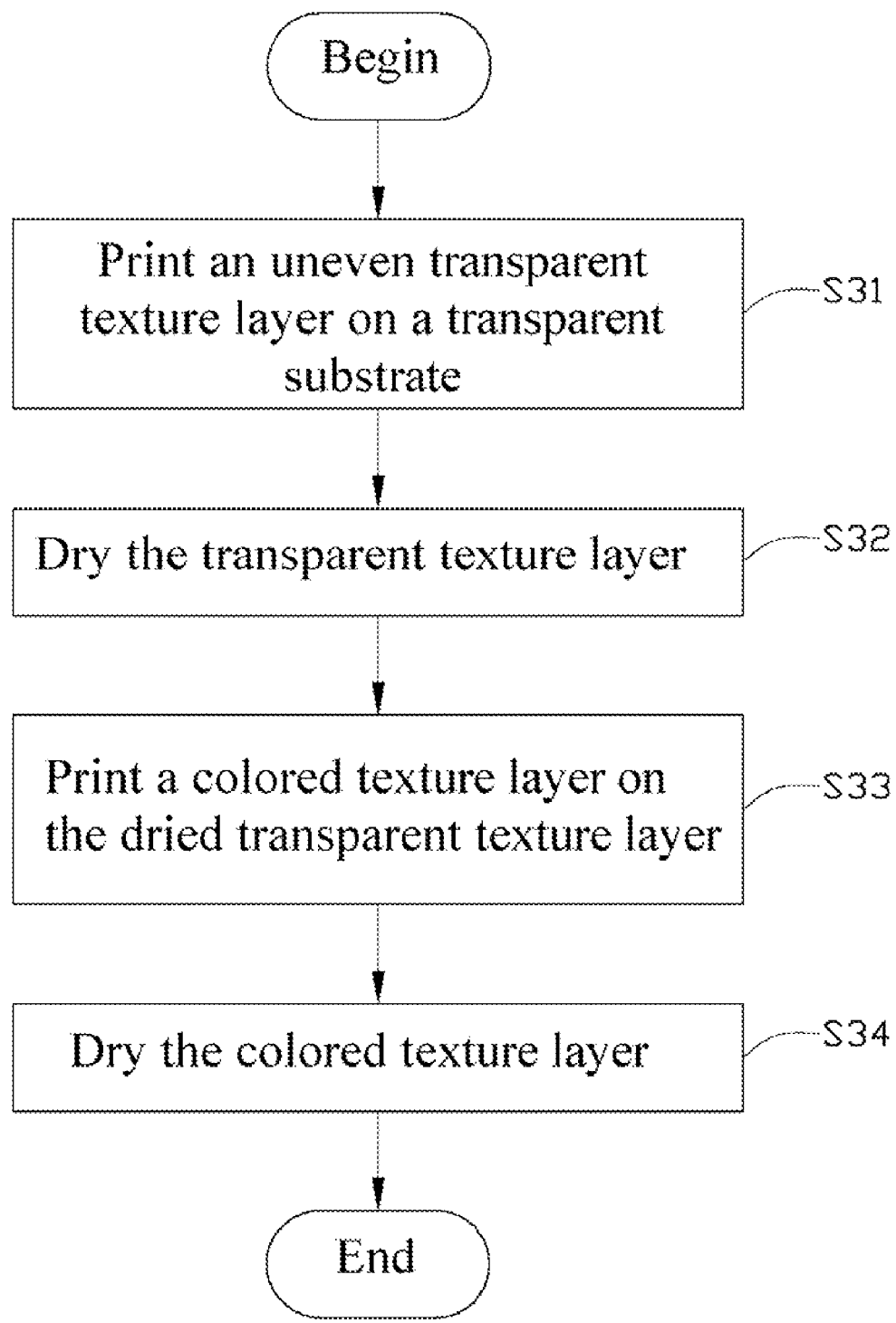
FIG. 3 is a flowchart of a three-dimensional effect printing method applied in the electronic device of FIG. 1, according to an exemplary embodiment.

Referring to FIG. 3, a three dimensional effect printing method according to an exemplary embodiment is disclosed. In a step S31, printing an uneven transparent texture layer 111 on the inner surface of the transparent substrate 110 by the printing method such as silk-screen, offset point, or gravure.

In a step S32, drying the transparent texture layer 111. In the embodiment, the housing 11 printed with the transparent texture layer 111 can be placed in a chamber and subjected to heat with a constant temperature of about 40 degrees Celsius for about 10 hours to dry the transparent texture layer 111.

In a step 33, printing a colored texture layer 112 on the uneven surface of the transparent texture layer 111 by the printing method such as silk-screen, offset point, or gravure.

In a step 34, drying the colored texture layer 112. In the embodiment, the housing 11 with the transparent texture layer 111 and the colored texture layer 112 can also be placed in the chamber with a constant temperature of about 40 degrees Celsius for about 10 hours to dry the colored texture layer 112.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An electronic device comprising:
   a housing comprising:
      a transparent substrate comprising an inner surface opposite to an outer surface facing a viewer;
      a transparent texture layer printed on the inner surface of the transparent substrate and having an uneven surface to form a textured pattern;
      a colored texture layer printed on the uneven surface of the transparent texture layer.

2. The electronic device as described in claim 1, wherein the transparent substrate is made of transparent resin.

3. The electronic device as described in claim 1, wherein the transparent texture layer is a layer of transparent printing ink and the colored texture layer is a layer of colored printing ink.

* * * * *